Feb. 18, 1969

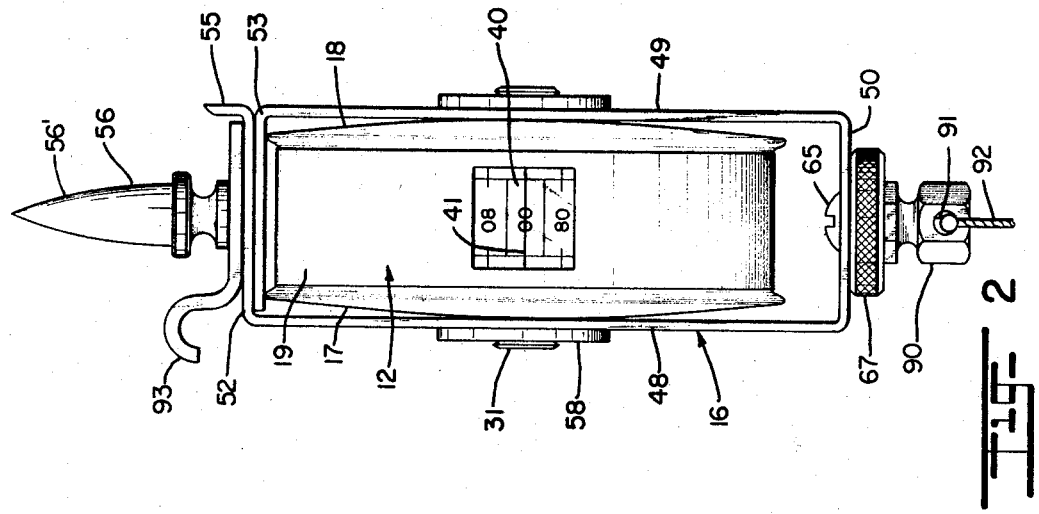
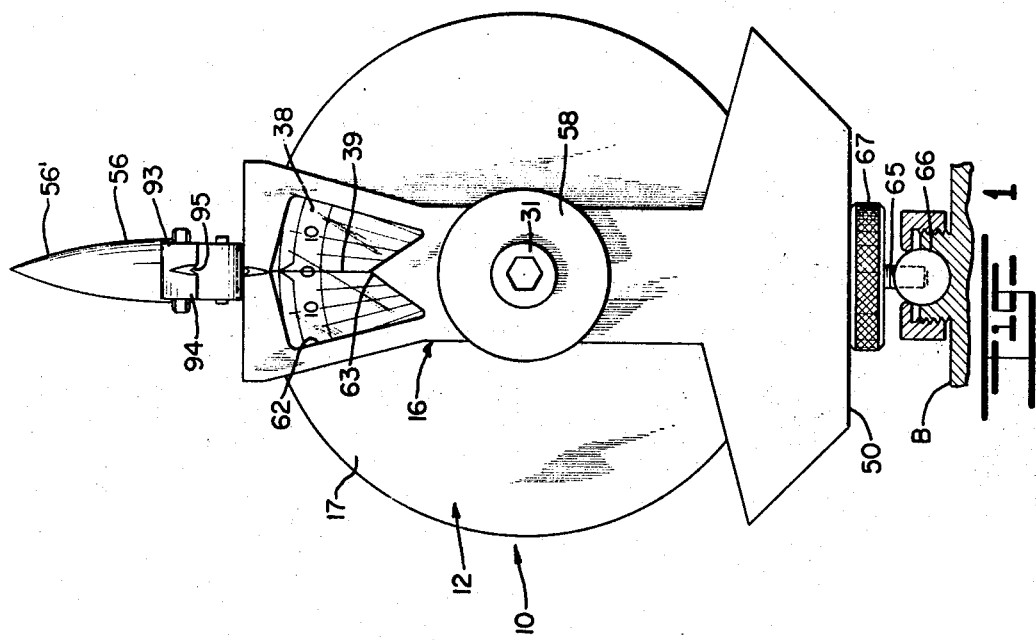
INVENTOR.
HAROLD JAMES TRACY

H. J. TRACY 3,427,724

INDICATING DEVICE

Filed Sept. 20, 1965

INVENTOR
HAROLD JAMES TRACY
BY

ATTORNEY

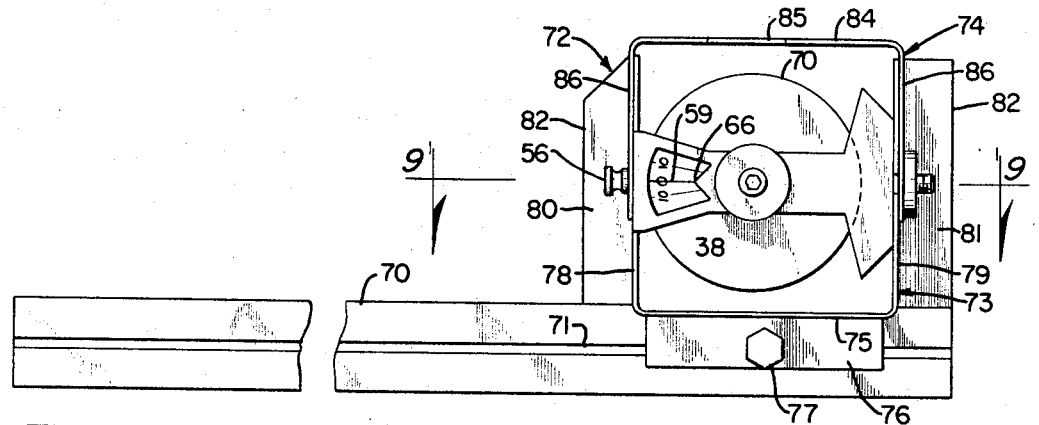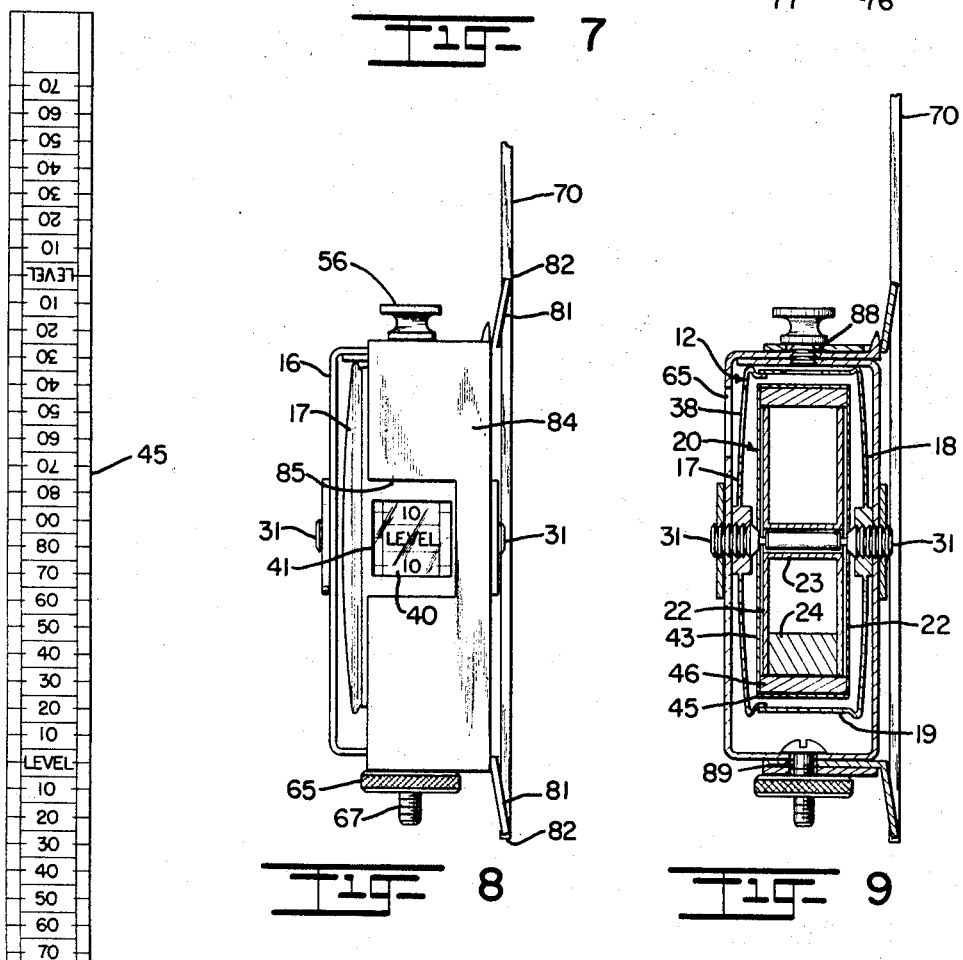

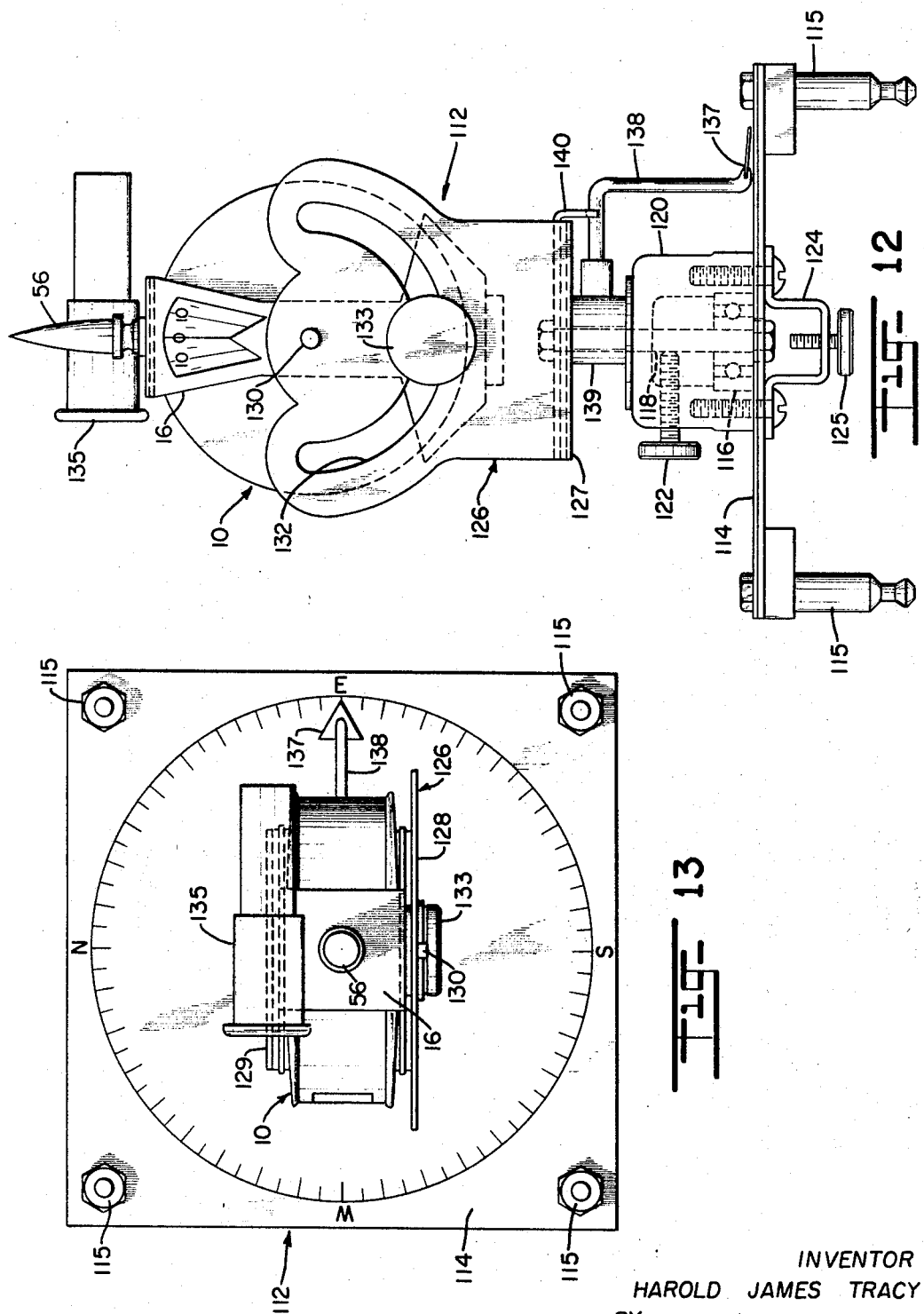

United States Patent Office

3,427,724
Patented Feb. 18, 1969

1

3,427,724
INDICATING DEVICE
Harold James Tracy, 2160 S. Hooker Way,
Denver, Colo. 80219
Filed Sept. 20, 1965, Ser. No. 488,709
U.S. Cl. 33—207                              13 Claims
Int. Cl. G01c 9/02

ABSTRACT OF THE DISCLOSURE

An indicating device comprises a weighted, gravity-responsive disk being mounted within a casing by means of a self-centering, self-lubricating bearing arrangement, and the disk has front and side peripheral indicator scales offset 90° from one another to facilitate reading of inclination and tilt from a common line of sight. An outer yoke associated with the casing facilitates mounting of the device in swivelled relation to a stationary base in motor vehicles and the like, in a carpenter's square or level, in a plumb bob or chalk marking device, or in a transit or surveying instrument.

---

The present invention generally relates to indicating devices; and more particularly relates to an indicating device embodied in a single instrument which is characterized by its ability to measure inclination and tilt both with reference to a horizontal and vertical plane in an accurate and reliable manner.

A principal object of the present invention is to provide in a single instrument housing for indicating means capable of measuring both inclination and lateral tilt; and wherein by virtue of its simplicity and versatility in use, the instrument of the present invention is readily conformable for use in providing level or grade indications and settings in a number of applications, such as, for instance transits or surveying instruments, carpenter squares and levels, plumb-bobs, chalk marking devices and the like.

It is another object of the present invention to provide for a grade or level indicating device of the type described which is comprised of a minimum number of parts, is simplified and economical to produce, as well as being compact, rugged and durable in construction; and the device being adaptable for releasable attachment to various different equipment and tools for reading inclination and tilt, and in use is accurate and capable of reading by degress virtually any angle or position of the equipment or tool both with reference to a horizontal and vertical plane; furthermore, the device being so constructed and arranged as to permit accurate reading virtually in any position with respect to the user or operator.

It is a further object of the present invention to provide in an indicating device incorporating a gravity responsive scale or indicator for an improved self-centering, self-lubricating bearing which is highly simplified yet dependable in use, together with an improved manner and means for mounting the instrument in swiveled relation to a stationary base or surface to permit viewing for tilt and inclination readings from one or more positions.

In accordance with the present invention, the versatility of the indicating device will be more readily appreciated from the following detailed description of various different forms of invention wherein the device may be used independently to measure inclination and tilt of a moving vehicle, or attached as an accessory in a carpenter's square or level, in a plumb-bob or chalk marking device, and further as a unitary part of a transit or surveying instrument. In particular, the versatility of the device can be recognized from the fact that the operator can take readings both of inclination and tilt from one unitary instrument without shifting his position or altering his line of sight. Thus, for instance, the instrument in one position will indicate the angle of climb or descent of a vehicle and upon rotating 90 degrees will indicate the angle of lateral tilt. In addition, the instrument can provide an indication of angular variations in exact degrees from virtually any position instantly without extrapolation, having particular utility in tools for carpenters and construction workers. Moreover, the device can be used not only to determine existing grades but furthermore can also be set to establish a desired grade and therefore has useful application in surveying instruments and transit equipment. The unique bearing construction forming a part of the instrument also establishes a high degree of accuracy in readings while damping undesired movement or vibration of the indicator dial, and enables the device to be comprised of a minimum number of parts.

The above and other objects, advantages and features of the present invention will become more readily understood from a consideration of the following detailed description of different form and applications of the present invention when taken together with the accompanying drawings, in which:

FIGURE 1 is a front elevational view of the preferred form of indicating device adopted for attachment to a vehicle or other moving object.

FIGURE 2 is a side view thereof.

FIGURE 5 is a view of the side peripheral indicating scale.

FIGURE 7 is an elevational view of a carpenter square incorporating the preferred form of indicating device.

FIGURE 8 is an enlarged side view of the carpenter square.

FIGURE 9 is a sectional view taken on lines 9—9 of FIGURE 7.

FIGURE 12 is a front elevational view of a transit incorporating the indicating device of the present invention; and FIGURE 13 is a top plan view of the transit shown in FIGURE 12.

Figure 4:
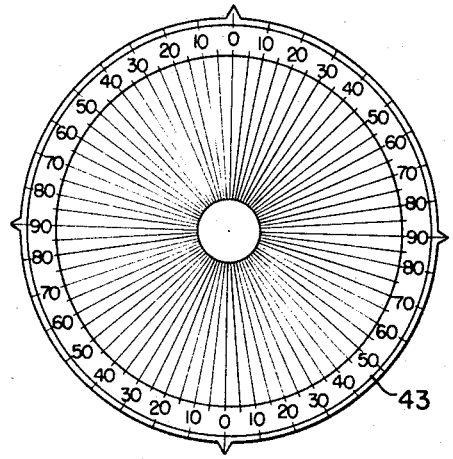
FIGURE 4 is a view of the front indicating scale.
Figure 3:
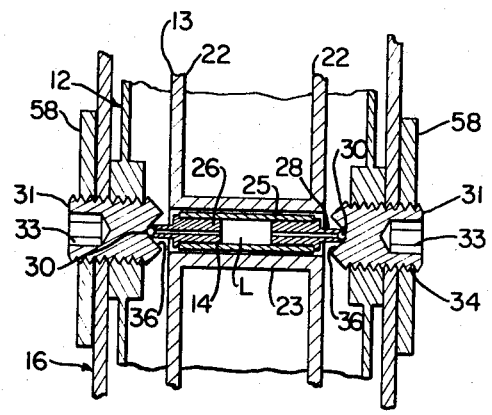
FIGURE 3 is an enlarged cross-sectional view of the pivotal bearing portions for the preferred form of indicating device.

Referring in detail to the drawings, there is shown by way of illustrative example in FIGURES 1-6 a preferred form of indicating device or instrument 10 which is broadly comprised of an outer casing or instrument housing 12 for a circular disk member 13 supported for pivotal movement within the housing by a pivot axle or shaft 14, and an outer yoke or adapter 16 serves as a means of mounting the device either in swiveled relation on a stationary base B or in fixed relation to a tool or other piece of equipment.

Considering in more detail the construction and arrangement of the indicating device, the outer casing 12 is of shallow cylindrical configuration to define front and rear circular wall surfaces 17 and 18 joined together by a common outer peripheral wall surface 19. Specifically referring to FIGURES 3 and 9, the circular disk member 13 takes the form of a hollow spool 20 having front and rear circular plates or disk portions 22 connected in spaced parallel relation by a center sleeve 23. As shown in FIGURE 9, a suitable weight 24 is fixed in off-center relation between the plates 22 and the pivot axle 14 is held in close-fitting relation within the sleeve, as shown, by means of a bushing 25; or as will be apparent the pivot axle may be threaded into fixed relation so as to be held rigidly in place at the center of the disk member. Preferably, the pivot axle 14 is formed of tubular sections 26 having axially opposed reduced socket end portions 28, each socket end supporting a ball bearing 30 in journaled relation therein, and the hollow interior of the tubular sections communicates with a reservoir for a suitable lubricant designated at L to lubricate the ball bearing surfaces. It will be noted that the ball bearings 30 project outwardly from the socket ends 28 for engagement with pivot mounts 31 centrally positioned on the front and rear wall surfaces 17 and 18 of the casing. Preferably each of the front and rear pivot mounts 31 is defined by an externally threaded stem having an Allen head socket 33 at its outer end for threaded adjustment of the stem through a threaded aperture 34 in each wall surface of the casing; and an inner concave surface 36 is formed at the inner end of each mount 31 to receive one of the ball bearings 30 and in this way to support the entire disk in self-centering relation. As a result the disk member 13 is free to rotate or pivot within the casing and by virtue of the off-center weighted portion 24 is gravity-responsive since the weight at the lower edge of the disk will of course center on gravity.

Another important feature of the present invention resides in the manner in which indicating means are provided on the disk member to follow movement of the disk to measure both inclination and lateral or sidewise tilt of the vehicle or other object on which the indicating device is mounted. Stated another way, the device will provide when aligned in one direction with respect to the path of travel of the vehicle an indication of the angle of climb or descent of the vehicle, or in other words, its inclination with respect to a horizontal plane. However when swiveled to a position at 90 degrees with respect to the direction of travel of the vehicle, such as, for example, from the position shown in FIGURE 1 to that shown in FIGURE 2, will provide an indication of lateral tilt, that is, angular variation from a vertical reference plane. For this purpose, the outer casing 12 has a front viewing aperture 38 located adjacent to the upper edge of the front wall surface 17 and with a vertical reference line 39 extending radially of the casing. Similarly, the outer peripheral wall surface 19 of the casing is provided with a side viewing aperture 40 with a horizontal reference line 41, extending parallel to the center axis of the casing and in 90° off-set relation to the vertical reference line 39 on the front surface of the casing.

Lateral tilt readings are furnished by a front circular reading scale 43 which, as illustrated in FIGURE 4, preferably is graduated from zero to ninety degrees extending circumferentially both left and right of the center top and bottom edges of the scale. In a corresponding manner, a side scale 45, shown in FIGURE 5, takes the form of a calibrated strip which is graduated to read from "level", or zero, both upward and downward through 90 degree intervals from the level or horizontal marking. Here the calibrating strip is affixed to an inner core 46 in surrounding relation to the outer peripheral edges of the front and rear plates 22 of the disk and in this relation will serve as an outer support both for the front scale 43 and the peripheral scale 45. Generally, therefore the scales are graduated to read angular variations up to 90 degrees away from either a vertical or horizontal plane, although this is clearly a manner of selection and when desired the scales can be graduated to provide readings from zero to 180 degrees in either direction, depending upon the desired application or intended use of the indicating device.

Figure 6:
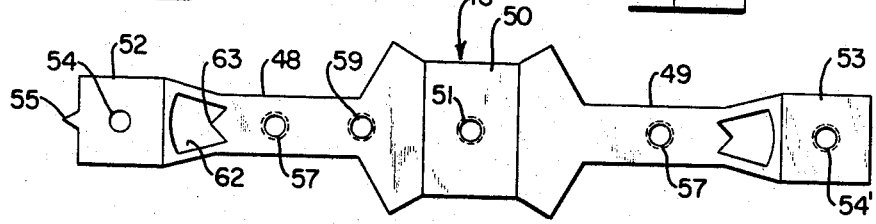
FIGURE 6 is a development view in detail of the yoke for the preferred form of indicating device.

In the installation of the indicating device, it is desirable to provide a yoke or adaptor 16 which will make the device readily adaptable for attachment in either swiveled relation to a stationary base or in fixed relation to a portable hand tool. To this end, the yoke 16 preferably is stamped from an elongated strip of metal as shown in FIGURE 6, and wherein the strip is bent into rectangular form to include spaced parallel front and rear plates 48 and 49 having a common relatively wide, lower connecting end 50 provided with a threaded opening 51. Upper connecting ends 52 and 53 are bent into overlapping relation, the end portion 52 having an opening 54 and pointer 55, and the connecting end 53 including a threaded opening 54' aligned with opening 54 to receive a common connecting screw 56. In order to support the casing in fixed relation within the yoke, the side plates have central, threaded openings 57 to threadedly receive the pivot mounts 31, and the mounts 31 are locked in place by suitable lock washers 58. Another threaded opening 59 is provided adjacent the lower edge of the front plate 48 to receive a locking screw for a purpose to be described. The front plate 48 is also recessed as at 62 to correspond with the front viewing aperture 38 on the casing and a lower pointed edge 63 is directed along the vertical reference line 39. The entire assembly as described may be mounted as illustrated in FIGURE 1 in swiveled relation to the base B, for example, by inserting a mounting bolt 65 through the opening 51 in the lower connecting end and securing same to a ball joint connection 66 and the bolt 65 having a lock nut 67 to rigidly connect it to the yoke 16.

In practice, when the device is installed, such as, for instance on the dashboard of an automobile, normally the front reading scale 43 is disposed in facing relation to the driver, and as the disk is rotated under the influence of gravity will measure and indicate tilt variations of the vehicle in the direction of travel. Then by rotating or swiveling the casing 90 degrees about the mounting bolt to bring the side reading aperture 40 into facing releation to the operator, the side reading scale 45 will provide accurate readings of the angle of climb or descent of the vehicle. The above is accomplished without the operator having to change his line of sight since the side reading scale 45 is disposed in perpendicular relation to the front reading scale and is offset 90 degrees therefrom. Otherwise, if the side reading scale were simply aligned with the front reading scale and necesitated viewing of information or grade measurements from the top of the disk, it would be impossible for the operator to take readings both of lateral tilt and inclination from the same line of sight. If desired, additional viewing apertures may be provided both in the front and rear surfaces of the casing with a second reading scale corresponding to the scale 43 in the rear disk portion of the disk member; also side viewing apertures may be spaced at quarterly intervals around the outer periphery of the casing to permit more convenient reading of the scale, although when used as an indicating device normally it is sufficient to have the front and side reading apertures 38 and 40 as shown.

Now referring to FIGURES 7–9, the instrument 10 of the present invention is illustrated for use in a carpenter square made up of a rule or straight edge 70 having a longitudinal groove 71 and a detachable mounting bracket 72 positioned at one end of the rule. Specifically, the bracket 72 consists of inner and outer generally U-shaped bracket portions 73 and 74, respectively, being interconnected to form a rectangular opening or space which is sized for releasable attachment of the instrument 10. Specifically the instrument 10 is mounted in fixed, side-by-side relation to the rule 70 and in such a way that the front reading scale 43 and side reading scale 45 will give accurate readings of angular variations either from a vertical or horizontal plane. In the bracket, the portion 73 has an inner closed end 75 provided with an outwardly projecting lateral flange 76 extending in overlapping relation to the top surface of the rule 70 with aligned openings provided in the flange and rule for insertion of a suitable bolt or screw 77 thereby fixing the bracket in stationary relation. Alternately the bracket may be slidably connected to the rule, in accordance with conventional practice, but for the purpose of describing the present invention is illustrated as being fixed at one end of the rule. The portion 73 additionally includes opposed parallel sides 78 and 79, each side having a lateral flange 80 and 81, respectively, projecting outwardly and downwardly from its respective side and terminating in guide edges 82 at right angles to the rule 70. Most desirably, the straight edge 82 for the flange 81 forms a continuation in flush relation to one end of the rule or in other words is squared to the end of the rule as illustrated in FIGURE 7.

The outer bracket portion 74 similarly is provided with an outer enclosed end 84 having an open slot 85 aligned with the side reading aperture 40 on the indicating device 10, and opposite sides 86 of the outer bracket portion are positioned in overlapping relation to the sides 78 and 79 of the inner bracket portion. In order to rigidly but releasably attach the instrument 10 within the bracket, openings or slots 88 and 89 are formed in opposite sides of the inner and outer bracket portions to be aligned with one another and with the openings in the upper and lower connecting end portions of the yoke 16. In this way, the connecting screw 56 may be inserted through the slots 88 and connected to the upper end of the yoke, and the mounting bolt 67 is projected outwardly through the slots 89 from the lower connecting end 50 of the yoke to receive the lock nut 65 which is tightened against the external surface of the lower oustide plate 86.

In use, the front reading scale 43 or side reading scale 45 will afford readings when rule 70 or the lower guide edge 82 is positioned along a generally vertical or horizontal surface; and for example will furnish readings from and to any points on a vertical wall, floor or ceiling surface as well as for the purpose of determining any desired angle with reference to a desired angular setting.

The indicating device 10 of the present invention is also adaptable for use as plumb-bob by mounting a string-connecting member 90, as shown in FIGURE 2, on the extremity of the mounting bolt 65. Here the member 90 has a slotted end 91 for insertion of a plumb-bob line or string 92, and the connecting screw 56 at the opposite end includes a tapered nose or tip 56'. When the indicating device is suspended by the string, any undue sway or swing of the device may be avoided by reading the scale and setting the tip 56' exactly beneath the upper point of suspension of the string. Here it will be noted that the device is suspended with the scale in inverted relation but again may be conveniently read from above since the graduations on the scale run through 360 degrees, and therefore the lower graduations on the scale will appear through the front reading aperture 38 on the casing.

The indicating device 10 further may be utilized in marking a chalk line, see FIGURE 2, and this is readily accomplished by positioning a lateral projection 93 at the upper connecting end of the yoke 16 with the outer curved end 94 of the projection extending forwardly along the top center of the casing and having an open guide slot 95. Again, the string-connecting attachment 90 is secured to the bolt 65, and a marking line or string, not shown, leads from the attachment 90 through slot 95 for extension along the surface to be marked. In use, the line can be snapped at the precise desired angle on a surface, such as, a wall or side of the building by setting the device 10 at the desired angle, as read for example through the side or front aperture, and directing the string 92 along a straight line parallel to the pointed end of the connecting screw 56. It will be evident that the lateral projection 93 may also extend rearwardly across the top of the yoke so that the curved end 94 is positioned over the pointer 55 and the line will then extend through the slot 95 on the side opposite to the front viewing aperture. This will of course facilitate reading of angles through the front aperture when the line is positioned along a wall surface.

Figure 10:
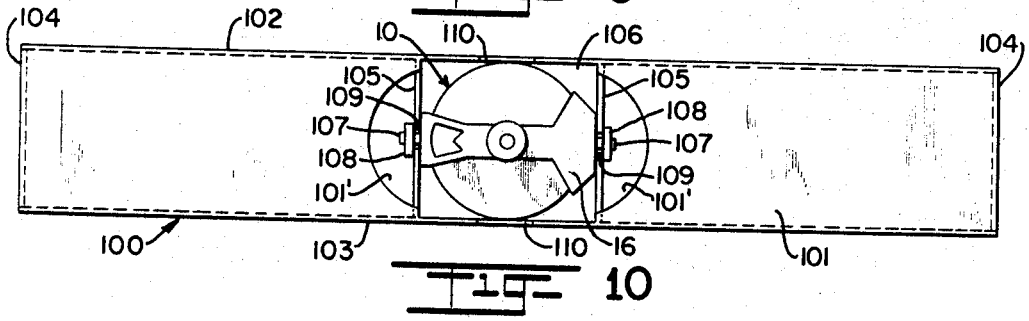
FIGURE 10 is a top plan view of a carpenter level incorporating the indicating device of the present invention.
Figure 11:
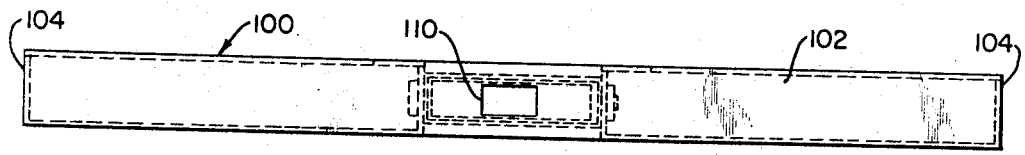
FIGURE 11 is an end view of the carpenter level shown in FIGURE 10.

In FIGURES 10 and 11, the indicating device is mounted in a carpenter level 100. For the purpose of illustration, the level body is formed of a pair of elongated rectangular blocks 101 secured in spaced facing relation to one another between top and bottom portions 102 and 103 and bounded by outer end portions 104 together with a pair of inwardly disposed intermediate ribs 105. The ribs 105 extend in spaced parallel relation between the top and bottom edges to form a central opening 106 for insertion of the indicating device 10, and the blocks have arcuate slots 101 adjacent to each rib in order to afford a clearance space for connection of the upper connecting ends on the yoke 16 to one of the braces 105 and the lower connecting end 50 on the yoke to the opposite brace 105. As shown, suitable connecting bolts 107 with lock nuts 108 may be employed to interconnect opposite connecting ends of the yoke to the ribs 105 through openings 109 on the ribs 105 and in such a way that the front reading aperture 38 is exposed from the front of the level and the side reading aperture 40 is exposed through a slot 110 in the top of the level. Most desirably when utilized as part of a level, the indicating device includes a rear indicating scale and the rear wall of the casing and the rear plate are recessed to form a viewing aperture for the rear scale; similarly, the side of the casing opposite the viewing aperture 40 is recessed and the bottom edge portion 103 is correspondingly recessed so that readings can be taken from any one of the four sides of the central opening 106.

In FIGURES 12 and 13, a transit or surveying instrument 112 is illustrated wherein the instrument 10 of the present invention may be utilized both for setting and reading grade levels. Here the transit is made up of a flat rectangular base plate 114 provided with suitable compass and circular degree readings on its top surface and is elevated by means of adjustable legs 115 at its four corners. A bearing 116 supports a shaft 118 on the base plate for vertical extension through an inverted, cup-shaped boss 120 which is bolted to the base plate, and a lock screw 122 projects transversely through one side of the boss to releasably lock the shaft against rotation. A tripod adapter 124 with an adaptor nut 125 is bolted to the underside of the table.

The instrument 10 is installed in a generally U-shaped cradle 126 in which the lower closed end 127 of the cradle is clamped to the upper end of the shaft 118 with spaced apart, upwardly extending sides 128 and 129 having aligned openings to receive pivot pins 130 forming outward continuations to receive Allen heads inserted within the sockets 33 on the pivot mounts 31. In addition, the one side 128 of the cradle has a semicircular slot 132 for a cradle adjusting, locking screw 133 engageable with the threaded opening 59 in the yoke.

A scope or sight 135 is mounted at the upper end of the yoke, and a pointer or vernier 137 depends downwardly from an arm 138 which is rotatably secured by a collar 139 in outer concentric relation to the shaft 118 beneath the cradle. A guide 140 serves to align the cradle and sight with the vernier 137 which guide is positioned in spaced relation above the top surface of the base 114 for selecting the desired bearing or direction of each reading.

In use, the pointer or vernier is set at the desired angle and locked in place by the shaft locking screw 122. The instrument is set at the desired grade level by loosening the cradle knob and pivoting the instrument 10 until the proper angle is read through either one of the side apertures or face apertures, then the cradle knob is tightened and the scope 135 is trained on the area to be surveyed all in a conventional manner. As described, the transit is adaptable for mounting on a tripod or any flat surface, and will enable accurate sightings and readings to be taken in a rapid, dependable manner.

From the foregoing, it will be appreciated that the indicating device of the present invention is simplified in construction and versatile in use so as to be conformable for use in a variety of different applications. In this relation, the importance of providing a means for indicating angular variations both with respect to the vertical and horizontal plane in one instrument will be recognized from its adaptability to such different uses, and particularly its ability to indicate both inclination and tilt in a moving vehicle or object. Thus when installed in an automobile it may act as a warning device to provide the operator with a visual reference in degrees of the grade being climbed or descended as well as the degree of tilt. Employed in an airplane the device would similarly be utilized to measure turn, bank and angle of climb in virtually any position of the craft. Employed in carpenter's tools, such as, chalk line marking devices, squares or levels as described, the instrument enables the operator without reference to any setting or object to select and hold a desired angle to the precise degree and can check such angles along the ceiling, floor or vertical wall surfaces each to the exact readable degree.

In all such applications the device is readily attachable either in fixed or pivotal relation either for measuring a particular angle or for setting the tool to a particular angle; yet the instrument is capable of reading or setting to 360 degrees either with respect to a horizontal or vertical plane. In this connection, when the device is set at some acute angle to the vertical or horizontal the improved form of bearing mount employed will minimize drag with highly sensitive gravity-response to angular variations.

It is therefore to be undestood from the foregoing that the device of the present invention would have practical advantageous use in applications other than those specifically set forth and described and generally could be usefully applied to any application where it is desirable to compute or accurately read angles in virtually any direction or attitude to the line of sight of the observer.

What is claimed is:

1. An indicating device comprised of an outer support member having a front wall and a peripheral side wall, a weighted gravity responsive member being mounted for free pivotal movement about a center horizontal pivotal axis within said outer support, a first viewing aperture in said front wall containing a first reference setting, a second viewing aperture in said side wall containing a second reference setting, first indicating means mounted on said gravity responsive member for registering with said first viewing aperture, second indicating means mounted on said gravity responsive member for registering with said second viewing aperture, said first and second indicating means serving to indicate against their respective reference settings the angular deviation in a plane perpendicular to said pivotal axis of said outer support from said gravity responsive member, said outer support being mounted for rotation about a vertical axis, so that one using the device may observe the deviations in one plane by viewing one of said first and second apertures and then without altering his line of sight observe the deviation in another plane perpendicular to said one plane by rotating the outer support 90° and viewing the other of either of said first or second apertures.

2. In a bank and climb indicator for motor vehicles and the like, an indicating device comprising an outer cylindrical casing having front vertical and side horizontal reference settings, a gravity-responsive disk being mounted for rotation about a pivotal axis within said casing, said disk having a first indicator scale arranged on one face of said disk for reading angular deviations of the vehicle from horizontal on the front vertical reference setting and a second indicator scale arranged along the outer peripheral surface of said disk and being offset 90° from said first indicator scale for reading angular deviations of the vehicle from horizontal on the side horizontal reference setting, and means mounting said device for rotation about a vertical axis so that one using the device may without altering his line of sight rotate the device for successively viewing indications of bank and climb on the front vertical and side horizontal reference settings, respectively.

3. In a bank and climb indicator for motor vehicles and the like according to claim 2, said disk having a pivot shaft including ball bearing members journaled in outwardly projecting relation at opposite ends of said shaft, and pivot mount portions aligned on opposite sides of said casing in contacting relation to said ball bearing members.

4. In a bank and climb indicator for motor vehicles and the like according to claim 3, said pivot shaft recessed inwardly of said ball bearing members to provide a lubricant reservoir therein and lubricant passages communicating with opposite ends of said shaft for lubricating the surfaces of said ball bearing members.

5. An indicating device comprising an outer casing of shallow cylindrical configuration having front and rear wall surfaces with an outer peripheral side wall surface therebetween, the front wall surface being provided with a first viewing aperture containing a first reference setting and the outer peripheral side wall surface being provided with a second viewing aperture containing a second reference setting, pivot mounts positioned in said front and rear wall surfaces and aligned centrally of the casing in opposed facing relation to one another; a gravity-responsive disk member disposed within said casing including a weight fixed in off-center relation and a pivot shaft positioned centrally of said disk with opposite ends of said shaft including bearings journaled therein and projecting outwardly into engagement with the said pivot mounts; a yoke having front and rear plates being secured to said pivot mounts externally of said casing, diametrically opposed connecting end portions joining opposite ends of said front and rear plates in spaced relation to the outer peripheral wall surface of said casing, and said front plate including a viewing aperture aligned with the first viewing aperture on said casing; and a first degree-reading scale on a front surface of said disk for registering with said first viewing aperture and a second degree-reading scale on a side peripheral surface of said disk for registering with said second viewing aperture, said first and second degree-reading scales serving to indicate against their respective reference settings the angular deviation in a plane perpendicular to the pivot shaft of said outer casing from said gravity-responsive disk, the graduations on said second degree-reading scale being offset 90° from the graduations on said first degree-reading scale so that one using the device may observe the deviations in one plane by viewing one of said first and second viewing apertures and then without altering his line of sight observe the deviations in another plane perpendicular to said one plane by turning the device 90° about an axis through said connecting end portions and viewing the other of said first and second viewing apertures.

6. An indicating device according to claim 5 further including a plumb bob secured to one of said connecting end portions and a plumb bob line attachment at the other of said connecting end portions.

7. An indicating device according to claim 6, one of said conecting end portions including a lateral projection provided with a guide slot aligned with the front viewing aperture and the other of said connecting end portions having a chalk marking line attachment thereon, and a chalk marking line extending from said attachment through the guide slot in said lateral projection.

8. An indicating device according to claim 5 further including a carpenter square having an elongated, relatively flat rule, a detachable mounting bracket being secured to the rule, said bracket including a straight edge portion extending normal to the rule, and said indicating device being releasably secured to said bracket, said gravity-responsive disk member mounted in said support for pivotal movement about an axis normal to the plane of said square.

9. In a carpenter square according to claim 8, said mounting bracket being defined by a pair of generally U-shaped plates being interconnected to form a central opening for insertion of said indicating device, and said bracket having outwardly projecting lateral flanges extending downwardly and outwardly from opposite sides of said plates and terminating in straight edge portions normal to said rule.

10. An indicating device according to claim 5 further including a level having an elongated, generally rectangular body provided with a central opening therein, said indicating device positioned in the opening with said weighted gravity-responsive disk member mounted for pivotal movement within the body of said level, and indicating scales being exposed for viewing from the front, rear and diametrically opposed sides of said body.

11. In a surveying instrument having a horizontal base provided with a graduated scale thereon and a cradle mounted in upstanding relation for rotational movement about a vertical axis through the center of said base, an indicating device including an outer casing pivotally supported on said cradle, said casing having a front wall and a peripheral side wall, a first viewing aperture in said front wall containing a first reference setting, a second viewing aperture in said side wall containing a second reference setting, an inner concentric gravity-responsive member mounted for independent pivotal movement about the pivotal axis of said casing including first indicating means for registering with said first viewing aperture and second indicating means for registering with said second viewing aperture, said first and second indicating means serving to indicate against their respective reference settings the angular deviation of said casing in a plane perpendicular to the pivotal axis of said casing from said gravity-responsive member so that one using the instrument may observe the deviations in one plane by viewing one of said first and second apertures and then without altering his line of sight observe the deviation in another plane perpendicular to said one plane by rotating said cradle 90° and viewing the other of said first and second apertures.

12. In a surveying instrument according to claim 11, said casing having normally vertical and horizontal reference settings for said first and second indicating means, respectively, and locking means extending through an arcuate guide slot in said cradle for releasably engaging said cradle whereby to adjustably position said reference settings in predetermined angular relation to their respective indicating means.

13. In a surveying instrument having a base and a cradle mounted for rotation on said base, the combination therewith of an outer casing supported on said cradle for pivotal movement about a horizontal axis, said casing having front and rear vertical wall surfaces with an outer peripheral wall surface therebetween, the front wall surface being provided with a front viewing aperture and the outer peripheral surface being provided with a side viewing aperture; pivot mounts positioned in said front and rear wall surfaces and aligned centrally of the casing in opposed facing relation to one another; a gravity-responsive disk disposed within said casing including a pivot shaft positioned centrally of said disk with opposite ends of said shaft including ball bearings projecting outwardly into engagement with said pivot mounts; a first degree-reading scale arranged circumferentially on the front face of said disk member in aligned relation with the front viewing aperture on said casing; a second degree-reading scale arranged circumferentially along the outer peripheral surface of said disk in aligned relation with the side viewing aperture on said casing; said front and side degree reading scales serving to indicate against their respective viewing apertures the angular deviations of said casing in a plane perpendicular to the rotational axis of said cradle from said gravity responsive disk so that one using the instrument may observe the deviations in one plane by viewing one of said front and side viewing apertures and then without altering his line of sight observe the deviations in another plane perpendicular to said one plane by rotating the cradle 90° and viewing the other of said front or side viewing apertures; and said cradle including locking means engageable with said casing to adjustably lock said casing in position about said horizontal axis to adjustably position said front and side viewing apertures in predetermined angular relation to their respective reading scales.

References Cited

UNITED STATES PATENTS

| | | | |
|---|---|---|---|
| 393,879 | 12/1888 | Binkerd | 33—69 |
| 577,386 | 2/1897 | Munson | 33—70 |
| 689,323 | 12/1901 | Quimby | 33—220 |
| 735,763 | 8/1903 | Harman | 33—69 |
| 1,359,474 | 11/1920 | Wernick | 33—215.1 |
| 1,552,140 | 9/1925 | Gobatti | 33—215.1 XR |
| 2,499,737 | 3/1950 | Farrow et al. | 33—215.1 |
| 2,505,884 | 2/1950 | Cockerell | 33—215.1 |
| 2,694,866 | 11/1954 | Hanaver | 33—215.1 |
| 2,764,155 | 5/1956 | Churgin et al. | 33—69 |
| 2,990,622 | 7/1961 | Johnson | 33—215.1 |
| 3,160,962 | 12/1964 | Brame et al. | 33—215.1 |

FOREIGN PATENTS 510,490   1920   France.

LEONARD FORMAN, *Primary Examiner.*

L. ANDERSON, *Assistant Examine.*

U.S. Cl. X.R.

33—70, 215, 218